3,320,804
OPTICAL FLUID FLOWMETER
Mendel M. Halberstam, Brooklyn, N.Y., assignor to Newtek, Inc., a corporation of New York
Filed Nov. 6, 1964, Ser. No. 409,440
9 Claims. (Cl. 73—194)

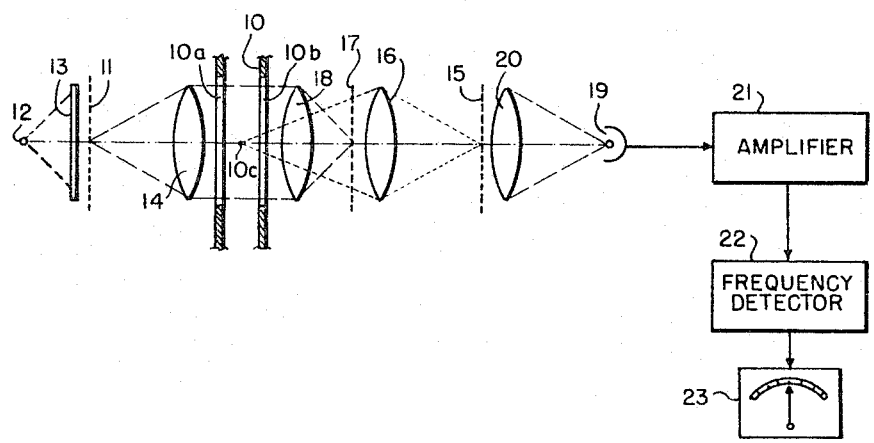

This invention relates to optical fluid flowmeters and, while it is of general application, it is particularly suitable for the measurement of fluid flow through a conduit without exposing any of the physical elements of the measuring apparatus to the fluid in the conduit.

The great majority of presently known fluid flowmeters involve some vane, impeller, or other mechanical element acted upon directly by the fluid to be measured or the use of pressure-differential obstructions in the conduit such as a venturi or orifice with associated differential pressure sensing instruments.

There is frequently a demand for measuring fluid flow through a conduit without any physical contact between the measuring apparatus and the fluid itself. Among such instruments are those for measuring the flow of extremely corrosive fluids; those for measuring the flow of mixtures of liquids and gases, and those applications in which it is desired to avoid any disturbances of the streamline flow through the conduit.

The present invention comprises an optical fluid flowmeter which is suitable for all such applications.

It is an object of the invention, therefore, to provide a new and improved optical fluid flowmeter for measuring the fluid flow in a conduit which includes no elements in physical contact with the fluid within the conduit.

It is another object of the invention to provide a new and improved fluid flowmeter of the type described which is simple, compact, and lightweight in construction.

In accordance with the invention, there is provided an optical fluid flowmeter comprising a fluid conduit including opposed aligned transparent portions, a mask including a pattern of areas of different optical density adjacent one of the transparent portions, means for illuminating the side of the mask remote from the conduit approximately uniformly, and a first optical system for translating the light passed by the mask through transparent portions. The flowmeter further comprises a light-chopping device, a second optical system for collecting light deflected by irregularities within the conduit arising from fluid turbulence or inhomogeneities and focusing it upon the light-chopping device, means for shielding such device from undeflected light passing through the transparent portions, and photosensitive means responsive to the light passing through the light-chopping device for developing an effect representative of fluid velocity.

For a better understanding of the present invention, together with other and further objects thereof, reference is had to the following description, taken in connection with the accompanying drawing, while its scope will be pointed out in the appended claims.

Refering to the drawing:

The single figure represents, partly schematically, an optical fluid flowmeter embodying the invention.

Referring now more particularly to the drawing, there is represented an optical fluid flowmeter comprising a fluid conduit 10 having opposed aligned transparent portions 10a, 10b which, if the conduit 10 is opaque, may be in the form of windows. Adjacent the transparent portion 10a is a mask 11 including a pattern of areas of different optical density, for example, a Ronchi ruling grid comprising alternate opaque and transparent strips.

The flowmeter further comprises means for illuminating the side of the mask or grid 11 remote from the conduit 10 approximately uniformly. This means may comprise a light source 12 and a light-diffusing screen 13 interposed between the source 12 and the grid 11 for illuminating the same. The light passed by the mask or grid 11 is translated by an optical system, for example a collimating lens 14, and through the transparent portions 10a, 10b of the conduit in a substantially parallel beam.

The flowmeter further includes a light-chopping device or grid 15 and a second optical system for collecting light irregularities within the conduit 10 arising from fluid turbulence and focusing it upon the grid 15. This optical system may comprise a lens 16 for imaging the light from the region of the point 10c within the conduit 10 at the grid 15.

The flowmeter further comprises means for shielding the light-chopping device or grid 15 from undeflected light passing through the portions 10a, 10b of the conduit 10. This shielding means may be in the form of a second mask or Ronchi grid 17 complementary to the first mask 11 and interposed between the transparent portion 10b of the conduit and the optical system comprising the lens 16.

The apparatus further comprises photosensitive means responsive to the light passing through the device for developing an effect representative of fluid velocity. This means may comprise a photoelectric cell or equivalent device 19, a collector lens 20 for collecting light passing through the light-chopping grid 15 and focusing it upon the photoelectric cell 19. The signal developed by the photocell 19 is applied via an amplifier 21 to a frequency detector 22 which develops an electrical signal representative of fluid velocity. The frequency detector 22 is, in turn, coupled to any suitable output device such as a meter or indicator 23 which gives directly an indication of the velocity of the fluid in the conduit 10.

It is believed that the operation of the optical fluid flowmeter of the invention will be apparent from the foregoing description. In brief, when there is no fluid flow through the conduit 10, the light passing through the Ronchi grid 11 illuminated by the screen 13 is collimated by the lens 14, passed through the conduit 10, and is imaged by the lens 18 on to the Ronchi grid 17 on the other side of the conduit 10. The grid 17 is positioned so that its opaque lines or strips block out the light in the image of the bright lines of the grid 11 so that, as a result, the following collector lens 20 picks up no light and no signal is developed by the photocell 19 and the elements coupled to it.

If, however, there is a flow of fluid in the conduit 10, slight variations in density occur as a result of small turbulences. The image lens 16 is positioned and aligned so that light scattered and refracted or deflected by these variations in density of the fluid in the conduit 10 is collected and brought to a focus on the grid 15. The turbulences or scattering points in the fluid move downstream in the conduit with the fluid velocity so that their images moves across the grid 15 with a proportional velocity. The light at the grid 15 is therefore chopped at a frequency proportional to the fluid velocity in the conduit 10. This chopped light is collected by the lens 20 and measured by the photocell 19 and frequency detector 22 to develop an electrical signal representative of the fluid velocity in the conduit 10. The electrical signal output of the frequency detector 22 may be applied to any suitable utilization device such as the velocity meter 23.

The elements comprising the optical fluid flowmeter of the invention are of a size such that the whole instrument may be made quite small and rugged, providing excellent reliability. The flowmeter includes no moving parts and the amplifier 21 and frequency detector 22 may, in accordance with common practice, utilize semiconductor signal translators and transducers.

While there has been described what is, at present, considered to be the preferred embodiment of the invention, it will be obvious to those skilled in the art that various changes and modifications may be made therein, without departing from the invention, and it is, therefore, aimed in the appended claims to cover all such changes and modifications as fall within the true spirit and scope of the invention.

What is claimed is:

1. An optical fluid flowmeter comprising:
a fluid conduit including opposed aligned transparent portions;
a mask including a pattern of areas of different optical density adjacent one of said portions;
means for illuminating the side of said mask remote from said conduit approximately uniformly;
a first optical system for translating the light passed by said mask through said portions;
a light-chopping device;
a second optical system for collecting light deflected by irregularities within said conduit arising from fluid turbulence or inhomogeneities and focusing it upon said device;
means for shielding said device from undeflected light passing through said portions;
and photosensitive means responsive to the light passing through said device for developing an effect representative of fluid velocity.

2. An optical fluid flowmeter comprising:
a fluid conduit including opposed aligned transparent portions;
a mask including a pattern of alternate opaque and transparent strips adjacent one of said portions;
means for illuminating the side of said mask remote from said conduit approximately uniformly;
a first optical system for translating the light passed by said mask through said portions;
a light-chopping device;
a second optical system for collecting light deflected by irregularities within said conduit arising from fluid turbulence or inhomogeneities and focusing it upon said device;
means for shielding said device from undeflected light passing through said portions;
and photosensitive means responsive to the light passing through said device for developing an effect representative of fluid velocity.

3. An optical fluid flowmeter comprising:
a fluid conduit including opposed aligned transparent portions;
a Ronchi ruling grid adjacent one of said portions;
means for illuminating the side of said grid remote from said conduit approximately uniformly;
a first optical system for translating the light passed by said grid through said portions;
a light-chopping device;
a second optical system for collecting light deflected by irregularities within said conduit arising from fluid turbulence or inhomogeneities and focusing it upon said device;
means for shielding said device from undeflected light passing through said portions;
and photosensitive means responsive to the light passing through said device for developing an effect representative of fluid velocity.

4. An optical fluid flowmeter comprising:
a fluid conduit including opposed aligned transparent portions;
a mask including a pattern of areas of different optical density adjacent one of said portions;
a light source;
a light-diffusing screen interposed between said light source and said mask for illuminating the same approximately uniformly;
a first optical system for translating the light passed by said mask through said portions;
a light-chopping device;
a second optical system for collecting light deflected by irregularities within said conduit arising from fluid turbulence or inhomogeneities and focusing it upon said device;
means for shielding said device from undeflected light passing through said portions;
and photosensitive means responsive to the light passing through said device for developing an effect representative of fluid velocity.

5. An optical fluid flowmeter comprising:
a fluid conduit including opposed aligned transparent portions;
a mask including a pattern of areas of different optical density adjacent one of said portions;
means for illuminating the side of said mask remote from said conduit approximately uniformly;
a collimating lens for translating the light passed by said mask through said portions in a substantially parallel beam;
a light-chopping device;
an optical system for collecting light deflected by irregularities within said conduit arising from fluid turbulence or inhomogeneities and focusing it upon said device;
means for shielding said device from undeflected light passing through said portions;
and photosensitive means responsive to the light passing through said device for developing an effect representative of fluid velocity.

6. An optical fluid flowmeter comprising:
a fluid conduit including opposed aligned transparent portions;
a mask including a pattern of areas of different optical density adjacent one of said portions;
means for illuminating the side of said mask remote from said conduit approximately uniformly;
a first optical system for translating the light passed by said mask through said portions;
a light-chopping grid;
a second optical system for collecting light deflected by irregularities within said conduit arising from fluid turbulence or inhomogeneities and focusing it upon said grid;
means for shielding said grid from undeflected light passing through said portions;
and photosensitive means responsive to the light passing through said grid for developing an effect representative of fluid velocity.

7. An optical fluid flowmeter comprising:
a fluid conduit including opposed aligned transparent portions;
a first mask including a pattern of areas of different optical density adjacent one of said portions;
means for illuminating the side of said mask remote from said conduit approximately uniformly;
a first optical system for translating the light passed by said mask through said portions;
a light-chopping device;
a second optical system for collecting light deflected by irregularities within said conduit arising from fluid turbulence or inhomogeneities and focusing it upon said device;
a second mask complementary to said first mask and interposed between the other of said conduit portions and said second optical system for shielding said device from undeflected light passing through said portions;
and photosensitive means responsive to the light passing through said device for developing an effect representative of fluid velocity.

8. An optical fluid flowmeter comprising:
a fluid conduit including opposed aligned transparent portions;
a mask including a pattern of areas of different optical density adjacent one of said portions;

means for illuminating the side of said mask remote from said conduit approximately uniformly;
a first optical system for translating the light passed by said mask through said portions;
a light-chopping device;
a second optical system for collecting light deflected by irregularities within said conduit arising from fluid turbulence or inhomogeneities and focusing it upon said device;
means for shielding said device from undeflected light passing through said portions;
photosensitive means;
and a collector lens for collecting light passing through said device and focusing it upon said photosensitive means, thereby to develop an effect representative of fluid velocity.

9. An optical fluid flowmeter comprising:
a fluid conduit including opposed aligned transparent portions;
a mask including a pattern of areas of different optical density adjacent one of said portions;
means for illuminating the side of said mask remote from said conduit approximately uniformly;
a first optical system for translating the light passed by said mask through said portions;
a light-chopping device;
a second optical system for collecting light deflected by irregularities within said conduit arising from fluid turbulence or inhomogeneities and focusing it upon said device;
means for shielding said device from undeflected light passing through said portions;
a photoelectric device responsive to the light passing through said device;
and a frequency detector coupled to said photoelectric device for developing an electrical signal representative of fluid velocity.

References Cited by the Examiner

UNITED STATES PATENTS

| | | | |
|---|---|---|---|
| 2,826,956 | 3/1958 | Simmons | 250—218 X |
| 2,984,744 | 5/1961 | Lynch et al. | 73—194 X |
| 3,189,746 | 6/1965 | Slobodin | 250—218 X |
| 3,199,346 | 8/1965 | Stewart | 73—194 |

RICHARD C. QUEISSER, *Primary Examiner.*

E. D. GILHOOLY, *Assistant Examiner.*